United States Patent
Schoeck et al.

(10) Patent No.: US 10,972,614 B2
(45) Date of Patent: Apr. 6, 2021

(54) SYSTEMS AND METHODS OF AUDIO NOTIFICATION UPON STATE CHANGE

(71) Applicant: Microsoft Technology Licensing, LLC, Redmond, WA (US)

(72) Inventors: Kaitlyn Marley Schoeck, Seattle, WA (US); Alexander Norman Bennett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/223,032

(22) Filed: Dec. 17, 2018

(65) Prior Publication Data
US 2020/0195786 A1 Jun. 18, 2020

(51) Int. Cl.
*H04W 4/20* (2018.01)
*H04M 19/04* (2006.01)

(52) U.S. Cl.
CPC ............. *H04M 19/04* (2013.01); *H04W 4/20* (2013.01)

(58) Field of Classification Search
CPC ......... H04M 19/04; H04W 4/20; H04W 4/90; H04R 1/1016
See application file for complete search history.

(56) References Cited

U.S. PATENT DOCUMENTS

| | | | |
|---|---|---|---|
| 7,286,653 B2 | 10/2007 | Hartselle et al. | |
| 8,260,999 B2 | 9/2012 | Ganesh et al. | |
| 8,615,221 B1 | 12/2013 | Cosenza et al. | |
| 9,172,787 B2 | 10/2015 | Kemmler et al. | |
| 9,319,766 B2 | 4/2016 | Weinstein et al. | |
| 9,820,115 B2 | 11/2017 | Cohn et al. | |
| 2002/0087649 A1 | 7/2002 | Horvitz | |
| 2008/0235242 A1 | 9/2008 | Swanburg et al. | |
| 2009/0186629 A1 | 7/2009 | Soelberg et al. | |
| 2011/0065375 A1* | 3/2011 | Bradley | H04M 1/72577 455/1 |
| 2011/0141357 A1 | 6/2011 | Price et al. | |
| 2013/0018495 A1* | 1/2013 | Oksanen | H04R 1/1041 700/94 |
| 2014/0087704 A1* | 3/2014 | DeCesaris | H04W 4/12 455/416 |
| 2014/0141806 A1* | 5/2014 | Phulari | H04W 4/90 455/456.3 |

(Continued)

FOREIGN PATENT DOCUMENTS

| | | |
|---|---|---|
| WO | 2011071905 A2 | 6/2011 |
| WO | 2018115968 A1 | 6/2018 |

OTHER PUBLICATIONS

"Docking with HD dock", Retrieved From: http://www.motorola.com/hc/6100/verizon/wt/en-us/d1e532x.html, Retrieved on: Oct. 11, 2018, 3 Pages.

(Continued)

*Primary Examiner* — Barry W Taylor
(74) *Attorney, Agent, or Firm* — Ray Quinney & Nebeker P.C.; Paul N. Taylor

(57) ABSTRACT

A method of alerting a user to information includes receiving a notification while a portable electronic device is in communication with a second electronic device, queuing the notification, terminating the communication between the portable electronic device and the second electronic device, and playing an audible alert of the notification after terminating the communication.

17 Claims, 6 Drawing Sheets

(56) References Cited

U.S. PATENT DOCUMENTS

| | | | |
|---|---|---|---|
| 2014/0347188 A1 | 11/2014 | Alameh et al. | |
| 2015/0056920 A1* | 2/2015 | Huttunen | H04B 7/26 |
| | | | 455/41.2 |
| 2015/0186194 A1* | 7/2015 | Weigand | H04M 1/72569 |
| | | | 719/318 |
| 2015/0245126 A1 | 8/2015 | Shaffer | |
| 2016/0021158 A1* | 1/2016 | Donaldson | H04R 1/1041 |
| | | | 709/203 |
| 2016/0283930 A1 | 9/2016 | Haga | |
| 2016/0316544 A1* | 10/2016 | Rice | H05B 37/029 |
| 2016/0357510 A1* | 12/2016 | Watson | G06F 3/165 |
| 2017/0163076 A1* | 6/2017 | Park | G08B 21/18 |
| 2017/0318376 A1* | 11/2017 | Honeycutt | A63B 71/0686 |
| 2018/0131793 A1* | 5/2018 | Kim | H04M 1/05 |
| 2018/0322861 A1* | 11/2018 | Ibrahim | H04R 1/1041 |
| 2019/0306611 A1* | 10/2019 | McCollum Bechert | |
| | | | A44C 7/00 |

OTHER PUBLICATIONS

"Mi Bluetooth Headset Basic with Dock", Retrieved From: https://web.archive.org/web/20171221030033/https:/www.mi.com/us/mi-bluetooth-headset-basic-with-dock/, Dec. 21, 2017, 7 Pages.

"Notifications for Google Pixel Buds", Retrieved From: https://support.google.com/googlepixelbuds/answer/7560929?hl=en, Retrieved on: Oct. 11, 2018, 4 Pages.

"International Search Report and Written Opinion Issued in PCT Application No. PCT/US2019/064093", dated Mar. 18, 2020, 17 Pages.

\* cited by examiner

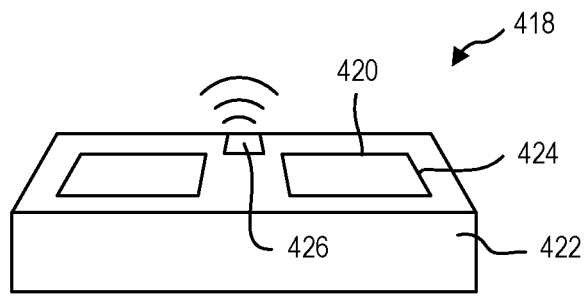
FIG. 4-1
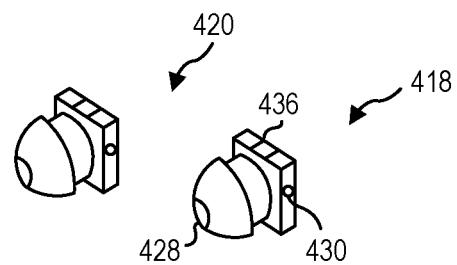
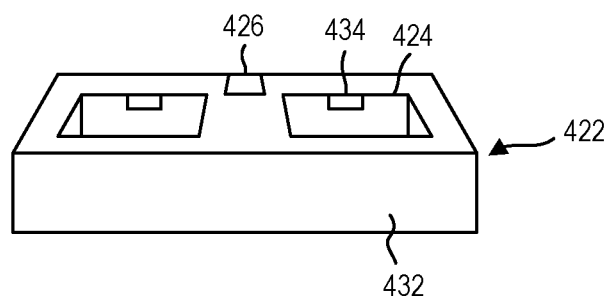
FIG. 4-2

SYSTEMS AND METHODS OF AUDIO NOTIFICATION UPON STATE CHANGE

CROSS-REFERENCE TO RELATED APPLICATIONS

N/A

BACKGROUND OF THE DISCLOSURE

Portable electronic devices are commonly used in public spaces and carried with a person throughout a day. The ability to engage with the audio of a personal device privately for the entire day is important. When a device is charging, syncing, or updating, the device may be left unattended. While unattended, there is a risk that notifications received during that period are not observed and may be missed, in particular, if the user receives additional notifications subsequently.

Providing contextual alerts that notifications were received while the user was away can allow for more reliable delivery of information to a user and can ensure that the user's information remains more private.

SUMMARY

In some embodiments, a method of alerting a user to information includes receiving a notification while a portable electronic device is in communication with a second electronic device, queuing the notification, terminating the communication between the portable electronic device and the second electronic device, and playing an audible alert of the notification after terminating the communication.

In some embodiments, an electronic system includes an earphone and a charging case. The case includes a port to receive the earphone. The case further includes a power supply to charge the earphone when the earphone is positioned in the port, a processor in electrical communication with the power supply, a communication device in data communication with the processor, and a hardware storage device in data communication with the processor. The hardware storage device has instructions stored thereon that, when executed by the processor, cause the processor to receive a notification from the data network while the earphone is positioned in the port, queue the notification, and play an audible alert related to the notification through the earphone when the earphone is removed from the port.

In some embodiments, a method of providing information to a user includes receiving a notification while a portable electronic device is in electrical communication with a second electronic device, queuing the notification in memory, terminating the communication between the portable electronic device and the second electronic device, and playing an audible alert of the notification with a speaker of the portable electronic device after terminating the electrical communication.

In some embodiments, a method of providing information to a user includes terminating communication between a portable electronic device and a second electronic device; after communication with the portable electronic device and the second electronic device is terminated, requesting information; receiving the requested information; and playing an audible alert of the requested information.

In some embodiments, a method of providing information to a user includes terminating a communication between a portable electronic device and a second electronic device, and playing an audible alert of a notification based upon terminating the communication.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a flowchart illustrating a method of providing audio information to a user, according to at least one embodiment of the present disclosure;

FIG. 2-2 is a flowchart illustrating another method of providing audio information to a user, according to at least one embodiment of the present disclosure;

FIG. 4-1 is a perspective view of earphones docked in a data connected charging case, according to at least one embodiment of the present disclosure;

FIG. 4-2 is a perspective view of the system of FIG. 4-1 with the earphones undocked from the charging case, according to at least one embodiment of the present disclosure;

FIG. 4-3 is a side view of the earphones being inserted into a user's ear before playing an audible alert, according to at least one embodiment of the present disclosure;

FIG. 4-4 is a system diagram of the electronic components of the charging case of FIG. 4-1 and FIG. 4-2, according to at least one embodiment of the present disclosure.

DETAILED DESCRIPTION

This disclosure generally relates to devices, systems, and methods for providing audio communications in a portable device. More specifically, the present disclosure relates the use of audio notifications to inform a user of any information or notifications the user may not have received. For example, many users monitor their portable electronic or communication devices throughout the day to receive information from friends, family, colleagues, and news organizations. Notifications can include receipt of a text message, such as a SMS message, a MMS message, or an internet-based text message; an email; a voice call, such as cellular, voice over internet protocol (VOIP), etc.; a video call; a calendar notification; third-party website or application notifications, such as social media or news organizations; or other notifications to alert a user to desired or useful information.

In some examples, a user may carry a smartphone on the user's person throughout the day in a pocket or a bag. The smartphone is, thereby, available or near the user, allowing the user to feel or hear vibration or audio alerts upon receipt of a notification. However, there is an opportunity for users to not receive notifications when the smartphone is left unattended. Common events that cause a smartphone to be left unattended include syncing the smartphone to a laptop or charging the smartphone. In contrast to a user's common practice of keeping a smartphone with the user, a user may plug the smartphone into a wired connection or place the smartphone on a stationary wireless charging pad for long periods of time. During that time period, the user may walk away or otherwise leave the smartphone unattended or unmonitored and fail to receive notifications. Unless the user actively wakes the smartphone upon retrieving the smartphone, the user may be unaware of received notifications for an extended period of time.

In some embodiments, systems and methods described herein queue notifications received while a data-connected electronic device is in communication with a second electronic device. When the communication between the first electronic device and the second electronic device is terminated, the system alerts the user to the queued notifications. Various alerts, such as audio, vibration, flashing display, etc., can be provided to a user to convey a summary of the notifications received while in communication with the second electronic device.

Figure 1:
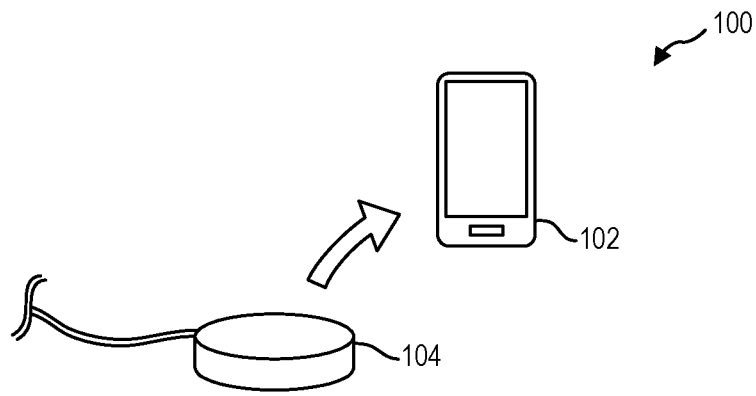
FIG. 1 is a perspective view of a system of a portable electronic device and a second electronic device terminating a communication therebetween, according to at least one embodiment of the present disclosure.

FIG. 1 illustrates an embodiment of a system 100 including a first electronic device 102 and a second electronic device 104. The first electronic device 102 is a smartphone or other data connected device that is capable of receiving data from a data network or other electronic device. For example, while the first electronic device 102 is illustrated as a smartphone in FIG. 1, in other embodiments, the first electronic device 102 is a portable personal computer, such as a laptop, a hybrid computer, or tablet computer; a wearable electronic device, such as a smartwatch, a head-mounted device, earphones, or other wearable device; or other portable electronic device.

The first electronic device 102 is in communication with the second electronic device 104. In some embodiments, the second electronic device 104 is a charging device, such as a wired power supply or a wireless magnetic inductive power supply; a personal computer, such as a desktop computer, a laptop computer, a hybrid computer, a tablet computer, etc.; an external audio-visual device, such as an external display or speakers; or other electronic device that may communicate with the first electronic device 102.

In some embodiments, the communication between the first electronic device 102 and the second electronic device 104 is a data communication. For example, the data communication may be a WiFi communication. In other examples, the data communication may be a cellular data communication (i.e., 3G, 4G, LTE, 5G, etc.). In yet other examples, the data communication may be a short-range wireless communication that allows the first electronic device 102 to transmit and receive data from the second electronic device 104. In at least one example, the data communication between the first electronic device 102 and the second electronic device 104 is a Bluetooth communication. In other examples, the data communication may be a wired communication. In at least one example, the data communication may be a universal serial bus (USB) connection, a FireWire connection, an optical connection, a serial port connection, or other wired data connection that allows the first electronic device 102 to transmit and receive data from the second electronic device 104.

In other embodiments, the communication between the first electronic device 102 and the second electronic device 104 is an electrical communication. For example, the electrical connection may be a wired connection that provides power to the first electronic device 102 to charge the first electronic device 102. In such examples, the second electronic device 104 may be a power adapter to provide power from an outlet or a battery-powered device, such as a portable power supply or another computing device, to charge the first electronic device 102.

In yet other embodiments, the communication between the first electronic device 102 and the second electronic device 104 is a magnetic induction connection. For example, the magnetic induction connection may be an inductive charging connection that wirelessly charges a compatible first electronic device 102 using a varying magnetic field produced by the second electronic device 104.

Removing the first electronic device 102 from the second electronic device 104 can terminate the communication between the first electronic device 102 and the second electronic device 104, as shown in FIG. 1. In other examples, disconnecting the electrical contacts of a wired connection can terminate the communication between the first electronic device 102 and the second electronic device 104. In yet other examples, altering a software or hardware setting in the first electronic device 102 and/or the second electronic device 104 can terminate the communication between the first electronic device 102 and the second electronic device 104.

Figures 1, 2:
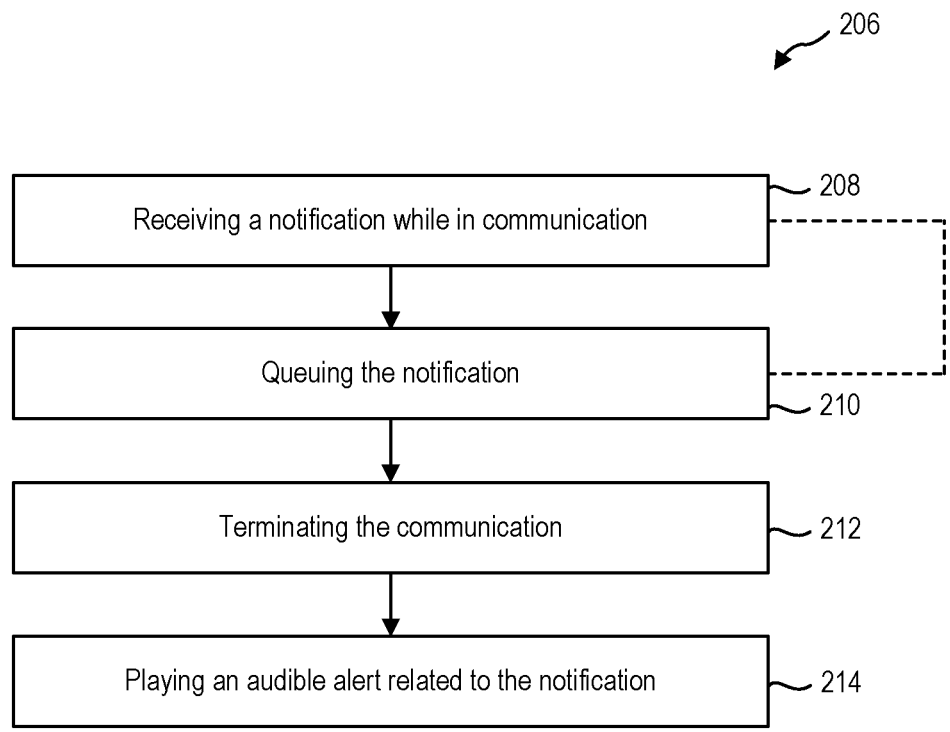
Figure 2:
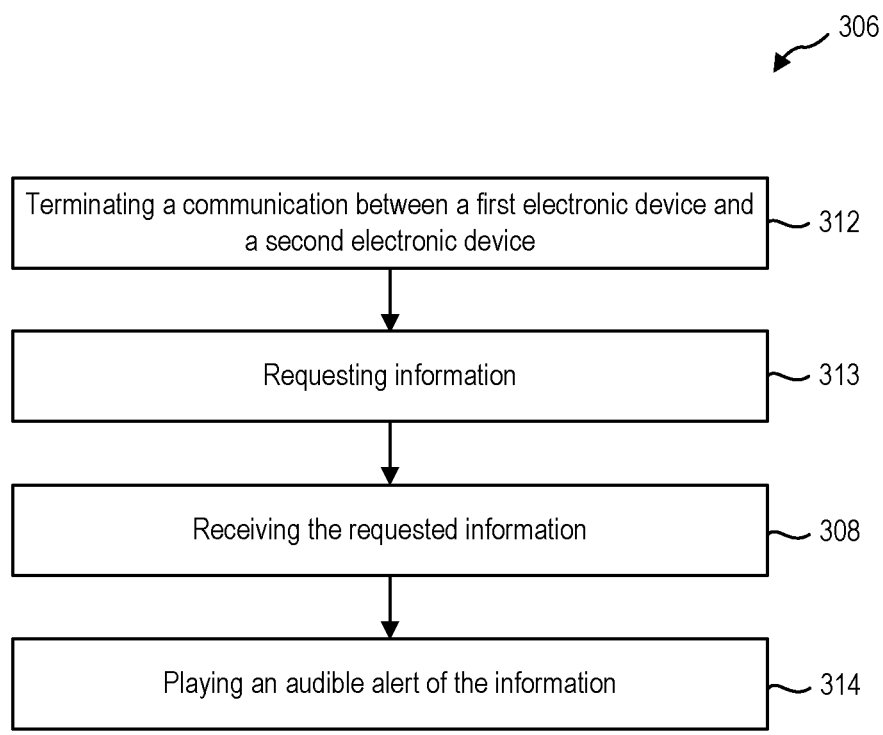

FIG. 2-1 is a flowchart illustrating a method 206 of providing audio information to a user, according to at least one embodiment of the present disclosure. The method 206 includes receiving a notification while a first electronic device is in communication with a second electronic device at 208. The devices and the communication between the devices can be any of those described in relation to FIG. 1.

The method 206 then includes queuing the notification at 210. In some embodiments, the notification is queued in memory of the first electronic device. In other embodiments, the notification is queued in memory of the second electronic device. For example, the first electronic device may be a smartwatch or other device that lacks a speaker or a particularly loud speaker, and the second electronic device may be a personal computer with speakers. In such embodiments, the first electronic device may receive the notification and then send the notification to the second electronic device via the data communication. In some embodiments, the first electronic device can receive additional notifications and queue those additional notifications while still in communication with the second electronic device.

The method 206 further includes terminating the communication between the first electronic device and the second electronic device at 212. After terminating the communication, the method 206 includes playing an audible alert related to the notification that had been queued at 214. In some embodiments, the audible alert is played by the first electronic device. For example, a smartphone may play an audible alert publicly through a speaker or earphones may play the audible alert privately for a user to hear only.

In some embodiments, the audible alert may be a text-to-speech translation of the notification received. For example, the audible alert may be a full text reading of a text message received. In other examples, the audible alert may be a summary reading of the notification received. In a particular example, the audible alert may include a sender and the subject line of a received email notification. In other embodiments, the audible alert may only state the type of notification received. For example, reading the text of an email may be unwieldy. Emails can be hundreds or thousands of words long and reading an email in its entirety may not be useful. In yet other embodiments, the audible alert may be a sound, such as a ring, a chime, or a beep that indicates to a user that notifications are queued and waiting.

FIG. 2-2 is a flowchart illustrating another method 306 of providing information to a user. The method 306 can provide information dynamically requested based on terminating a communication between a portable electronic device and a second electronic device. For example, a news service or social media platform may not provide push notifications, such as those receiving in the method 206 described in relation to FIG. 2-1. In some embodiments, a method 306 includes terminating the communication between the first electronic device and the second electronic device at 312 (such as described in relation to FIG. 1) and then requesting information at 313. The first electronic device then receives the requested information at 308 and plays an audible alert of the information at 314.

For example, terminating the communication can prompt a processor of the first electronic device to request information from an external computing device, such as a server or external computer, to fetch email information, news information, weather information, calendar information, social media information, or other types of information not stored locally on the first electronic device. In other examples, terminating the communication can prompt a processor of the first electronic device to request information from local source of the first electronic device, such as system memory or a hardware storage device, such as news information, weather information, calendar information, social media information, or other types of information stored locally on the first electronic device.

In at least one example, the methods of FIGS. 2-1 and 2-2 can be used in concert, allowing the first electronic device to queue notifications received while in communication with a second electronic device and, also, request information upon terminating the communication. In such examples, audible alerts are played to a user upon terminating a communication of the first electronic device and the second electronic device for both notifications received and queued during the communication and notifications requested and received upon terminating the communication ensuring the user does not miss any desired information.

Figure 3:
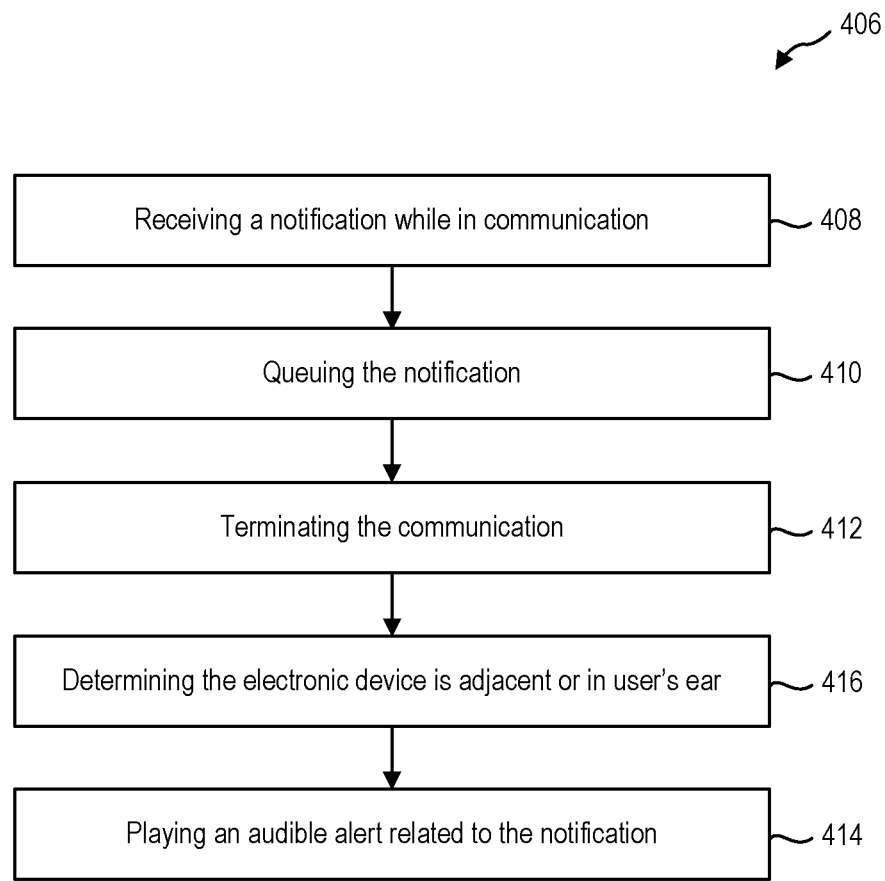
FIG. 3 is a flowchart illustrating a method of providing private audio information to a user, according to at least one embodiment of the present disclosure.

FIG. 3 is a flowchart illustrating another method 406 of providing audio information to a user. More particularly, the method 406 illustrated in FIG. 3 provides audio information to a user privately, avoiding playing notifications in a way that may make personal or private information audible to the public. The method 406 includes receiving a notification while a first electronic device is in communication with a second electronic device at 408. In particular, the first electronic device may be earphones, a smartphone, or another electronic device that may be positioned in or adjacent to a user's ear to play audio to a user privately. Additionally, any device that is conventionally positioned in or adjacent to a user's ear may play audio information more discretely for users concerned with maintaining privacy.

After receiving the notification, the method 406 includes queuing the notification at 410. In some embodiments, the notification is queued in memory of the first electronic device. In other embodiments, the notification is queued in memory of the second electronic device. For example, the first electronic device may be a smartwatch or other device that lacks a speaker or a particularly loud speaker, and the second electronic device may be a personal computer with speakers. In such embodiments, the first electronic device may receive the notification and then send the notification to the second electronic device via the data communication. In some embodiments, the first electronic device can receive additional notifications and queue those additional notifications while still in communication with the second electronic device.

The method 406 further includes terminating the communication between the first electronic device and the second electronic device at 412. After terminating the communication, the method 406 includes determining the first electronic device is adjacent to or in a user's ear at 416. In some embodiments, the first electronic device has a proximity sensor, such as an infrared proximity sensor. The proximity sensor may detect when a smartphone or other device is held up to the user's face. In other embodiments, the first electronic device includes a force sensor that will determine when the first electronic device is pressed against a user's ear or positioned in a user's ear, such as when wearing earphones or other head-mounted devices.

After determining the electronic device is adjacent to or in the user's ear, the method 406 includes playing an audible alert related to the notification that had been queued at 414. For example, by playing the audible alert after determining the first electronic device is adjacent to or in a user's ear, a smartphone or earphones may play the audible alert privately for only a user to hear.

As described above, in some embodiments, the audible alert is a text-to-speech translation of the notification received. For example, the audible alert may be a full text reading of a text message received. In other examples, the audible alert may be a summary reading of the notification received. In a particular example, the audible alert may include a sender and the subject line of a received email notification. In other embodiments, the audible alert may only state the type of notification received. For example, reading the text of an email may be unwieldy. Emails can be hundreds or thousands of words long and reading an email in its entirety may not be useful. In yet other embodiments, the audible alert may be a sound, such as a ring, a chime, or a beep that indicates to a user that notifications are queued and waiting.

Figures 3, 4:
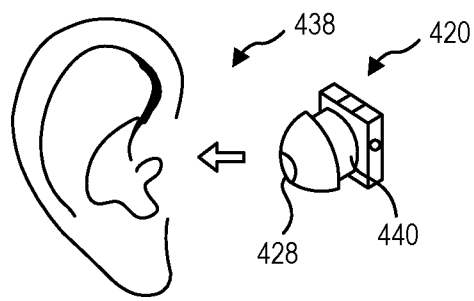
Figure 4:
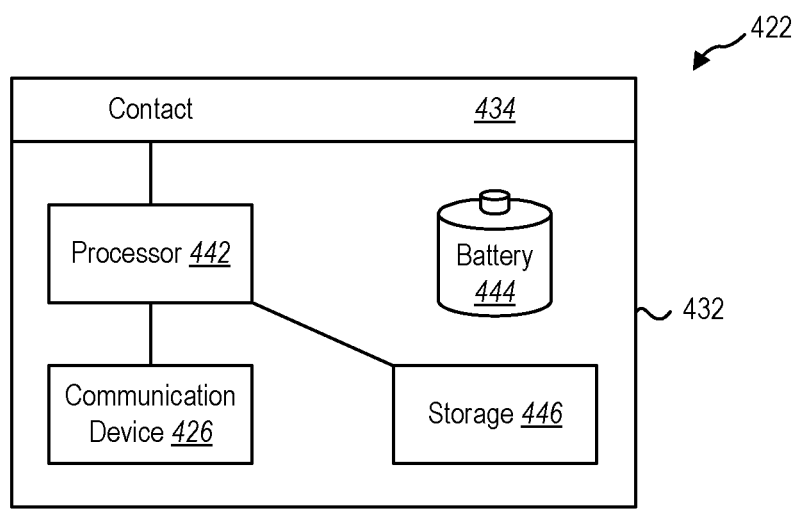

FIG. 4-1 through 4-4 illustrate an embodiment of a system 418 of earphones 420 and a data connected charging case 422 for the earphones 420, where the data connected charging case 422 may receive notifications from a data network and transmit them to the earphones 420. In the illustrated embodiment, the earphones 420 are the first electronic device and the charging case 422 is the second electronic device.

FIG. 4-1 is a perspective view of the system 418. The earphones 420 charge while docked in a port 424 of the charging case 422. While charging inside the case 422, the earphones 420 are unable to provide notifications to a user even as a case communication device 426 of the charging case 422 receives notifications from the data network.

FIG. 4-2 is a perspective view of the system 418 with the earphones 420 removed from the charging case 422. The earphones 420 contain a speaker 428 and a microphone 430 that allows a user to receive and send audio information through the earphones 420. The charging case 422 has a housing 432 with one or more ports 424 in an outer surface of the housing 432. The ports 424 are sized and shaped to receive the earphones 420 into the housing 432.

The housing 432 may include a case electrical contact 434. The case electrical contact 434 may contact and provide an electrical communication with an earphone electrical contact 436 positioned on the earphone 420. The electrical communication through the case electrical contact 434 and the earphone electrical contact 436 may allow the case 422 to provide electrical power to the earphones 420. In some embodiments, the case 422 may include a power supply to power the earphones 420 while the earphones 420 are docked in the ports 424 of the case 422. In other embodiments, the case 422 includes a power supply to charge a battery of the earphones 420, such that the earphones 420 can operate when not docked in the ports 424 of the case 422. In some embodiments, the power supply is a battery. In other embodiments, the power supply is a wired power supply that may draw electricity from another source, such as an electrical outlet.

The case communication device 426 may receive notifications and queue those notifications in the system memory of the charging case 422. The charging case 422 may wirelessly transmit the notifications to the earphones 420 to play through the speakers 428 of the earphones 420.

Removing the earphones 420 from the charging case 422 terminates the electrical communication of the case electrical contact 434 and the earphone electrical contact 436. However, playing an audible alert informing a user of the queued notifications would be ineffectual at this point, as the earphones 420 are merely removed from the case 422, but not yet worn by the user.

FIG. 4-3 is a side view showing the user inserting the earphone 420 into the user's ear 438. In some embodiments, the earphone 420 includes a sensor 440. The sensor 440 can be positioned to determine when the portion of the earphone 420 containing the speaker 428 is adjacent to or in the ear 438. In an example, the sensor 440 is a force sensor that detects the force applied by the user to insert the speaker 428 into the ear 438. In other examples, the sensor 440 is a proximity sensor that determines when the earphone is inserted or being inserted into an ear 438, and the sensor 440 can then prompt the play of the audible alert.

FIG. 4-4 is a system diagram illustrating the electronic components of the charging case 422. In some embodiments, the charging case 422 has a housing 432 that contains or supports a plurality of electronic components including a processor 442, a power supply such as a battery 444, and a hardware storage device 446. As described in relation to FIG. 4-1, the case 422 may contain or support a case communication device 426. The processor 442 is in data communication with the case communication device 426 and the hardware storage device 446. The power supply provides electrical power to the electronic components and, particularly, to the case electrical contact 434 of the case 422 to charge associated earphones (such as the earphone 420 described in relation to FIG. 4-2).

The hardware storage device 446 may be any platen-based storage device, solid-state storage device, or other non-transitory or long-term storage device. The hardware storage device 446 may have instructions stored thereon that, when executed by the processor 442 cause the processor 442 to perform any of the methods or techniques described herein.

Figure 5:
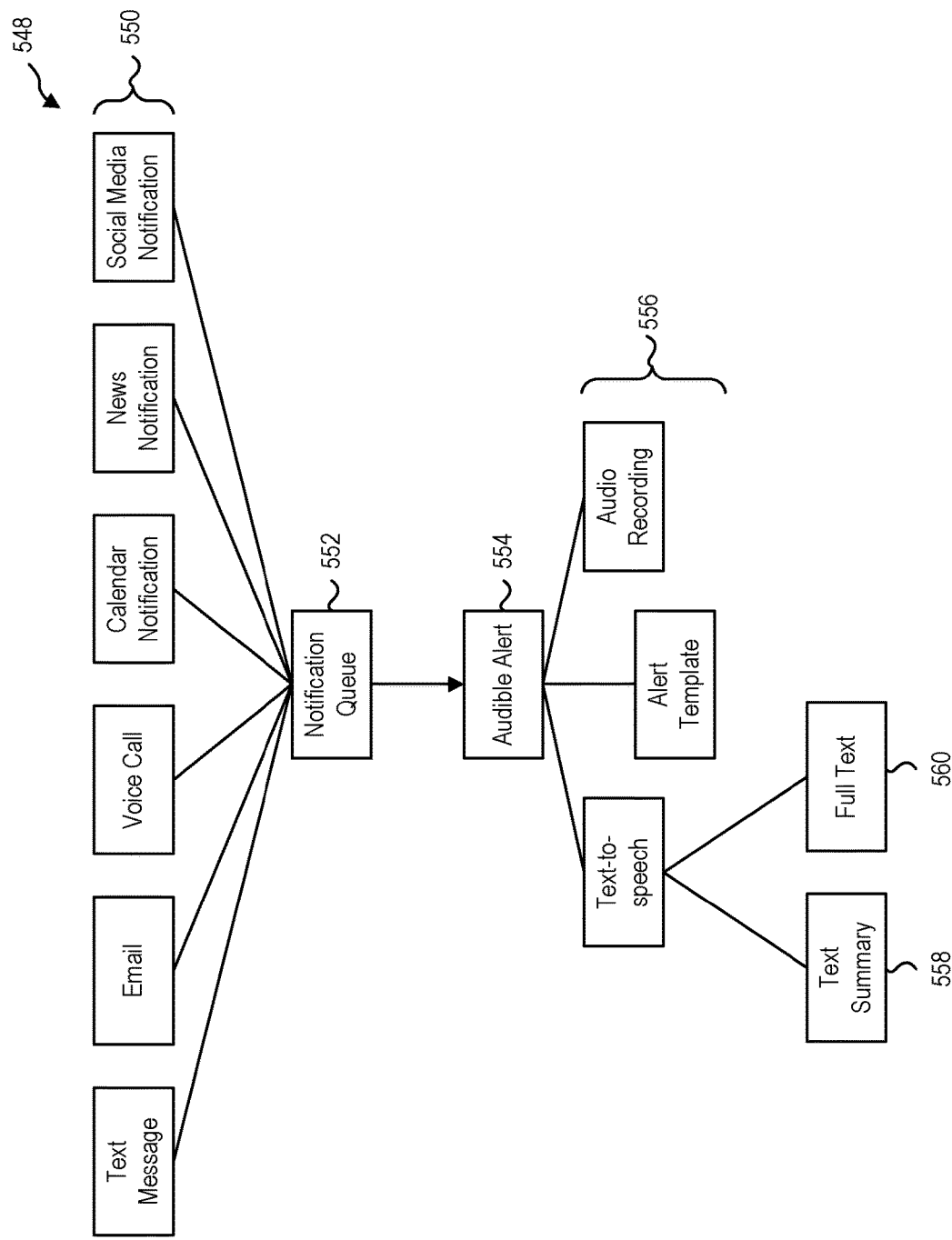
FIG. 5 is a flowchart illustrating the notification types that can enter a notification queue, and the audible alert types that are played in response, according to at least one embodiment of the present disclosure.

FIG. 5 is a flowchart 548 illustrating the different types of notifications 550 that may be queued and the different types of audible alerts that may be provided to a user in response to terminating a communication between a first electronic device and a second electronic device. The notification types include text messages, emails, voice calls, calendar event notifications, news service notifications, social media notifications, and any other notifications that are sent to or otherwise pushed to the electronic device. For example, other notifications may include notifications from home appliances that laundry is complete or a roast has finished cooking.

The notifications 550 received while the first electronic device and second electronic device are in communication are placed in a notification queue 552 in memory. As described herein, the notification queue 552 may be stored in the memory of the first electronic device or the second electronic device.

In some embodiments, the notification queue 552 queues the notifications 550 in order of arrival for the order of alerts. For example, the first notification 550 to arrive while the first electronic device and second electronic device are in communication may have the first audible alert 554 played informing the user of that notification 550 first (e.g., "first-in, first-out"). In other embodiments, the notification queue 552 queues the notifications 550 in the opposite order of arrival for the order of audible alerts 554. For example, the first notification 550 to arrive while the first electronic device and second electronic device are in communication may have the last alert audible 554 played informing the user of that notification 550 last (e.g., "first-in, last-out"). This may be beneficial when the most recently received notifications are more time-sensitive. In yet other embodiments, the notification queue 552 categorizes notifications 550 by notification type, allowing the audible alerts 554 to inform a user on the quantity of one notification type (e.g., "14 missed emails") or to provide audible alerts 554 of all of one notification type at one time (e.g., alerts for all voice calls first, all text messages second, all emails third, etc.).

The audible alerts 554 can have different audible alert types 556, including text-to-speech alerts, audio recordings, or alerts based on an alert template. The text-to speech alerts can be text summary alerts 558 or full text alerts 560. For example, the text summary alerts 558 can provide a text-to-speech audible alert that is the first sentence of an email, the subject line of an email, the sender of an email, a headline of a news service notification, the event title of a calendar event, or other abbreviated readings. The full text alert 560 may be used for text messages, social media notifications, or other notification types that are of shorter length.

In some embodiments, the audible alert 554 may be a full audio recording of the notification, such as with voicemails, voice memos, or voice-texts. The audio recording alert may be presented to a user with another audible alert to provide context. For example, another audible alert type 556 is an alert template. The template may import information from the notification to provide information to a user with context. For example, an alert template may include playing speech describing the identity of a caller that placed the voice call to the user, followed by a portion or all of the associated voicemail. In at least one example, the alert template may state the identity of the caller and the time of the missed call.

A system can also utilize the earphone and/or the microphone to provide a response to the alerts. For example, during or in a period of time after the audible alert is played for the user, a user may provide a verbal command or tap on the earphone to flag or archive the associated notification. The notification associated with that particular audible alert may be revisited later by the user.

The response can be a verbal response that is detected by the microphone of the case or the earphone and recognized by the processor of the case. In other examples, the response can be a physical response by touching or tapping the earphone or case. For example, the earphone or case may have a touch-sensing surface, such as a capacitive touch-sensing surface. In other examples, the earphone or case may have a switch or button thereon that can send a signal to the processor. In yet other examples, a force sensor of the earphone may be used to detect a tap on a body of the earphone to provide the response. In a further example, a proximity sensor of the earphone may be used to detect a gesture near the earphone, such as a wave of the user's hand past her ear, to respond to the audible alert.

In at least some embodiments, a system according to the present disclosure allows a user to be reminded of notifications sent to their electronic device while the electronic device is unattended. Audible alerts are more likely to be noticed by the user and may ensure that notifications are received by the user, thereby improving and simplifying the user experience with their portable electronic devices.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual embodiment, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of alerting a user to information, the method comprising:
   receiving a notification while at least one earphone is in communication with an electronic device;
   queuing the notification on the at least one earphone for later playing;
   terminating the communication between the at least one earphone and the electronic device; and
   playing an audible alert of the notification alert after both terminating the communication and the user positioning the at least one earphone adjacent to or in a user's ear.

2. The method of claim 1, receiving a notification including receiving a text message.

3. The method of claim 1, receiving a notification including receiving an email.

4. The method of claim 1, receiving a notification including receiving a voice call.

5. The method of claim 1, the communication between the electronic device and the at least one earphone being an electrical communication.

6. The method of claim 1, the communication between the electronic device and the at least one earphone being a magnetic induction communication.

7. The method of claim 1, the communication between the electronic device and the at least one earphone being a data communication.

8. The method of claim 1, queuing the notification including queuing the notification in memory of the electronic device.

9. The method of claim 1, further comprising:
requesting information with a processor upon terminating the communication, and
receiving the notification with the processor in response to requesting information.

10. The method of claim 9, wherein the requested information is weather information.

11. The method of claim 9, wherein the requested information is sports information.

12. The method of claim 9, wherein the requested information is traffic information.

13. The method of claim 9, wherein the requested information is social media information.

14. The method of claim 9, requesting information including requesting the information from a local source.

15. The method of claim 1, further comprising receiving at least one notification while the electronic device is in communication with the at least one earphone.

16. The method of claim 1, further comprising playing at least one notification of a notification queue upon terminating the communication.

17. The method of claim 1, wherein the electronic device is a personal computer, a charging device, or an external audio-visual device.

* * * * *